Patented Oct. 12, 1926.

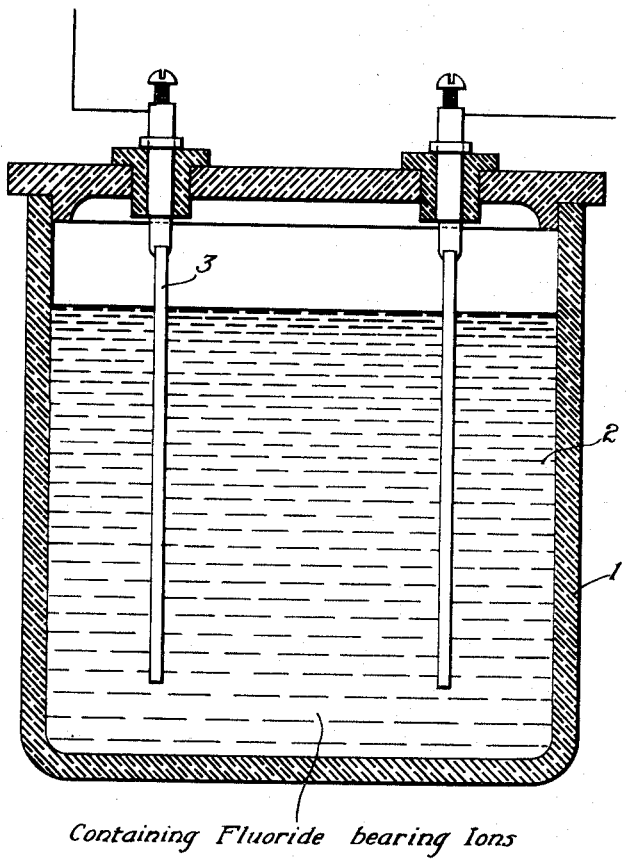

1,602,951

UNITED STATES PATENT OFFICE.

JOSEPH SLEPIAN, OF WILKINSBURG, AND EARL J. HAVERSTICK, OF OAKMONT, PENNSYLVANIA, ASSIGNORS TO WESTINGHOUSE ELECTRIC AND MANUFACTURING COMPANY, A CORPORATION OF PENNSYLVANIA.

ELECTROLYTE FOR ELECTROLYTIC CELLS.

Application filed December 9, 1919. Serial No. 343,519.

Our invention relates to electrolytes for use in electrolytic cells, such as lightning arresters, condensers, rectifiers and the like, and it has, for its object, to provide an electrolyte which shall be capable of acting upon film-forming metals, such as aluminum, magnesium, titanium and the like, to produce plates of high electric capacity and to provide the plates with asymmetric conducting films of great endurance when subjected to potentials of considerable magnitude for long periods of time.

Electrolytes for use in cells of the above indicated character may consist of aqueous solutions of various substances, the value of such substances for this purpose being determined by the electrical characteristics which they impart to the cells, among which are the power factors of the cells, capacity of the active plates, the endurance of the films upon the plates, the power losses in the cells and the voltages which the films will withstand without rupture.

Aqueous solutions may be broadly divided into two general classes, namely, those which may be employed in the usual well known manner to form asymmetric films upon the surfaces of certain metals known as film forming metals and including aluminum, magnesium, titanium and the like and those which are, in themselves, capable, only with difficulty, of forming films upon such metals under the action of alternating currents.

We have found, generally speaking, that superior electrolytes for use in electrolytic condensers, lightning arresters, rectifiers and the like may be formed by adding to an electrolyte solution that is capable of readily producing asymmetric films upon film-forming metals a relatively small amount of an electrolyte solution that is relatively incapable of affecting film-forming metals when subjected to alternating currents. Furthermore, we have ascertained, by extensive tests, that an electrolyte thus produced is capable. of forming and maintaining asymmetric films upon film-forming electrodes, suitably treated and employed in it, of such character that a cell embodying them is maintained in good operating conditions throughout its employment. Furthermore, cells embodying our improved electrolyte and electrodes formed by its use possess unusually desirable power factors.

While electrolytes embodying our invention may be acid or neutral in character, we have ascertained that the initial formation of the films upon the electrodes, as well as their reformation after breakdown will be much more rapid if the solution is alkaline or even contains a small amount of a free alkali. We, therefore, preferably add a small amount of any suitable alkali to the solution while it is being compounded.

The single figure of the drawing discloses a conventional form of electrolytic condenser comprising a container 1 for the electrolyte 2 in which are disposed the electrodes 3.

Although, for obvious reasons, we have not tested all possible combinations of all non-film-forming electrolytic solutions with all posible film-forming electrolytic solutions, such tests as we have conducted indicate that we may provide a markedly superior electrolyte for use in electrolytic condensers, rectifiers, lightning arresters and the like by adding any non-film-forming electrolyte, is small quantities, to any of the customarily employed film-forming electrolytes. For example, in practicing our invention, we may employ any of the well known film-forming electrolytes and we may add to them relatively small quantities of aqueous solutions of various salts or compounds of halogens, nitrates and the like which, in themselves, are non-film-forming with aluminum.

For example, we have found that the addition of small quantities of an aqueous solution of sodium fluoride or fluo-silicate or other fluoride bearing ions, such as fluoborate, fluo-titanate, fluo-arsenate and the like to the customary film-forming electrolytes, produces electrolytes having very superior qualities. In like manner, the addition of various nitrates, such as sodium nitrate or sulphates such as sodium or potassium sulphates to the various film-forming electrolytes give substantially uniformly good results.

While our invention is, in no way, restricted to any specific electrolyte, we have found that an electrolyte of substantially the following proportions affords very desirable results, the parts by weight of the various ingredients being the preferred amounts for use with a liter of water to form the electrolyte solution:—

|  | Grams. |
|---|---|
| Boric acid | 30 |
| Ammonium borate | 5 |
| Sodium hydroxide | 4 |
| Sodium fluoride | ½ |

The amount of alkali, such as sodium hydroxide, which may be added in any given case, as well as the amount of the non-film-forming salt or compound, which may be employed, must be determined, in each instance, by the particular film-forming electrolyte to which they are to be added. The amount of the non-film-forming salt is usually relatively small, usually ranging under 1%.

Electrolytes of the character specified, when employed in condensers, lightning arresters, rectifiers and similar cells of the electrolytic-valve type, are characterized by their substantial lack of any deteriorating effects upon the active plates of the cells which do not tarnish, corrode or pit, by the high capacity of the active plates and by the permanency and resistance to rupture of the asymmetric films formed upon them.

Furthermore, various electrolytic cells, such as condensers, embodying an electrolyte formed according to our invention, together with electrodes having asymmetric films formed by the employment of our improved electrolyte, possess unusually desirable power factors. For example, an electrolytic condenser, the plates of which were formed and employed in an electrolyte of the usual character, containing approximately 30 grams of boric acid and 5 grams of ammonium borate to a liter of water had a power factor of approximately 40%. On the other hand, a condenser of similar character but embodying an electrolyte identical with that of the first save for the addition of approximately 4 grams of sodium hydroxide and ½ gram of sodium fluoride, had the remarkably superior power factor of 4.2%.

Heretofore, certain electrolytic cells, and, particularly, electrolytic condensers have been of doubtful commercial value because of lack of uniformity. For example, while it has been possible from time to time, to form an individual condenser, or, in some instances, a small series of condensers having desirable characteristics, it has been impossible to duplicate these cells for reasons which have not been known. This has been the case, even though the greatest care has been taken, both in the selection of materials and in the treatment employed in forming the films upon the electrodes. By the employment of our present electrolyte, we find that it is possible to easily and certainly form condensers which will fully duplicate the desired characteristics of previously formed condensers, after which they are modeled, and this may be done without any particular care, either in the selection of materials of high purity and quality or in the treatment of the materials selected or in the methods followed in the formation of the films upon the electrodes. In other words, it is believed that the employment of an electrolyte compound in accordance with our invention will, in effect, commercialize the production of electrolytic condensers.

While the asymmetric films of the electrodes may be formed upon the electrodes by the employment of any of the ordinary electrolytes, and the electrodes thus provided may be employed in an electrolytic cell embodying my improved electrolyte with desirable results, we prefer to employ, and have found from practice that better results may be obtained by employing, our improved electrolyte in the formation of the asymmetric films upon the electrodes, as well as in the cell in which the electrodes are ultimately employed.

Because of the broad principles embodied in our invention, occasioned by the wide range of electrolyte-forming salts or substances which may be employed, it will be appreciated that our invention is to be in no way limited to any of the specific examples specified. In fact, our invention is to be restricted only as indicated in the claims in which it is our intention to cover each and every feature of novelty not disclosed by the prior art.

We claim as our invention:—

1. An electrolyte for electrolytic condensers, lightning arresters, rectifiers and the like comprising an aqueous solution containing in solution film-forming substances and a fluoride.

2. An electrolyte for electrolytic condensers, lightning arresters, rectifiers and the like comprising an aqueous solution capable of forming films upon film-forming metals, together with a relatively small amount of dissolved sodium fluoride.

3. An electrolyte for electrolytic condensers, lightning arresters, rectifiers and the like comprising an aqueous solution capable of forming films upon film-forming metals, together with a relatively small amount of dissolved sodium fluoride, and containing a relatively small amount of free alkali.

4. An electrolyte for electrolytic condensers, lightning arresters, rectifiers and the like comprising an aqueous solution of substantially 30 grams of boric acid, 5 grams of ammonium borate, 2 to 10 grams of sodium hydroxide and ½ to 3 grams of sodium fluoride to a liter of water.

5. An electrolyte for electrolytic condensers, lightning arresters, rectifiers and the like comprising an aqueous solution capable of forming films upon film-forming metals together with a relatively small amount of a dissolved salt giving, to some extent, fluoride ions in the solution.

6. An electrolyte for electrolytic condensers, lightning arresters, rectifiers and the like comprising an aqueous solution of an electrolyte comprising a borate capable of forming films upon film-forming metals, together with a relatively small amount of a dissolved salt capable of producing fluoride ions in the solution.

7. An electrolyte for electrolytic condensers, lightning arresters, rectifiers and the like comprising an aqueous solution capable of forming films upon film-forming metals together with a relatively small amount of a dissolved fluo-silicate.

In testimony whereof, we have hereunto subscribed our names this 8th day of December, 1919.

JOSEPH SLEPIAN.
EARL J. HAVERSTICK.